United States Patent
Kitagawa

(10) Patent No.: US 10,773,731 B2
(45) Date of Patent: Sep. 15, 2020

(54) DRIVING ASSISTANCE APPARATUS

(71) Applicant: DENSO CORPORATION, Kariya, Aichi-pref. (JP)

(72) Inventor: Nozomi Kitagawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 124 days.

(21) Appl. No.: 16/067,503

(22) PCT Filed: Oct. 14, 2016

(86) PCT No.: PCT/JP2016/080511
§ 371 (c)(1),
(2) Date: Jun. 29, 2018

(87) PCT Pub. No.: WO2017/119170
PCT Pub. Date: Jul. 13, 2017

(65) Prior Publication Data
US 2019/0016345 A1    Jan. 17, 2019

(30) Foreign Application Priority Data
Jan. 6, 2016 (JP) .................................. 2016-001000

(51) Int. Cl.
*B60W 50/14* (2020.01)
*G08G 1/0962* (2006.01)
(Continued)

(52) U.S. Cl.
CPC ......... *B60W 50/14* (2013.01); *G08G 1/09623* (2013.01); *G08G 1/163* (2013.01);
(Continued)

(58) Field of Classification Search
None
See application file for complete search history.

(56) References Cited

U.S. PATENT DOCUMENTS

2002/0036584 A1* 3/2002 Jocoy ................... G01S 13/931
                                                                342/70
2004/0263330 A1* 12/2004 Alarcon ................ G08B 5/006
                                                                340/539.23
(Continued)

FOREIGN PATENT DOCUMENTS

JP    S59-127200 A    7/1984
JP    H11-184521 A    7/1999
(Continued)

*Primary Examiner* — Genna M Mott
*Assistant Examiner* — Melanie J Patrick
(74) *Attorney, Agent, or Firm* — Maschoff Brennan

(57) ABSTRACT

A driving assistance apparatus in a vehicle includes a regulation determiner section, an assistance operator section, and a presentation operator section. The regulation determiner section determines a present traffic regulation in a running environment of the vehicle. The assistance operator section operates a driving assistance to a driver of the vehicle so as to comply with the present traffic regulation determined by the regulation determiner section. The presentation operator section operates a presentation of behavior reason information. When the assistance operator section operates the driving assistance to comply with the present traffic regulation corresponding to an attention traffic regulation stored in a regulation storage, the presentation operator section operates the presentation of behavior reason information on a reason of a behavior resulting from the operated driving assistance to comply with the present traffic regulation corresponding to the attention traffic regulation.

16 Claims, 9 Drawing Sheets

(51) Int. Cl.
*G08G 1/16* (2006.01)
*B60W 30/095* (2012.01)
*G06K 9/00* (2006.01)
*G08G 1/01* (2006.01)

(52) U.S. Cl.
CPC .... *B60R 2300/307* (2013.01); *B60W 30/0956* (2013.01); *B60W 2050/146* (2013.01); *G06K 9/00818* (2013.01); *G08G 1/0141* (2013.01)

(56) References Cited

U.S. PATENT DOCUMENTS

| | | | | |
|---|---|---|---|---|
| 2010/0268619 | A1* | 10/2010 | Farmer | G06Q 20/102 705/26.1 |
| 2011/0077028 | A1* | 3/2011 | Wilkes, III | B60W 50/14 455/456.3 |
| 2013/0141576 | A1* | 6/2013 | Lord | G08G 1/04 348/148 |
| 2014/0059686 | A1* | 2/2014 | Lin | G06F 11/076 726/23 |
| 2015/0220796 | A1 | 8/2015 | Yokoi | |
| 2015/0292900 | A1 | 10/2015 | Kitagawa | |
| 2015/0294193 | A1 | 10/2015 | Tate et al. | |
| 2016/0163217 | A1* | 6/2016 | Harkness | G09B 5/06 434/65 |
| 2017/0113686 | A1* | 4/2017 | Horita | B60W 30/12 |

FOREIGN PATENT DOCUMENTS

| | | |
|---|---|---|
| JP | 2000-090393 A | 3/2000 |
| JP | 2005-222485 A | 8/2005 |
| JP | 2006-096157 A | 4/2006 |
| JP | 2015-146119 A | 8/2015 |
| JP | 2015-204561 A | 11/2015 |

* cited by examiner

FIG. 9
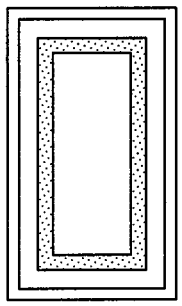
FIG. 10
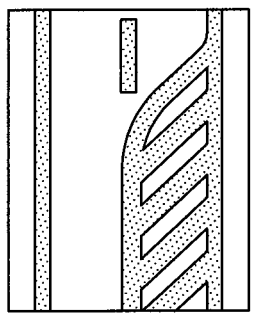
FIG. 11
| PRESENTATION COUNT | FREQUENCY |
|---|---|
| LESS THAN 4 TIMES | EACH TIME |
| EQUAL TO OR GREATER THAN 4 TIMES & LESS THAN 10 TIMES | ONCE PER TWO TIMES |
| EQUAL TO OR GREATER THAN 10 TIMES | ONCE PER FIVE TIMES |

FIG. 13

| PRESENTATION COUNT | PRESENTED OR NOT |
|---|---|
| LESS THAN 10 TIMES | PRESENTED |
| EQUAL TO OR GREATER THAN 10 TIMES | NOT PRESENTED |

FIG. 14

| PRESENTATION COUNT | MODE |
|---|---|
| LESS THAN 4 TIMES | DISPLAY (text/icon) + SPEECH OUTPUT |
| EQUAL TO OR GREATER THAN 4 TIMES & LESS THAN 10 TIMES | DISPLAY (text/icon) |
| EQUAL TO OR GREATER THAN 10 TIMES | DISPLAY (icon) |

…

DRIVING ASSISTANCE APPARATUS

CROSS REFERENCE TO RELATED APPLICATION

The present application is based on Japanese Patent Application No. 2016-1000 filed on Jan. 6, 2016, the disclosure of which is incorporated herein by reference.

TECHNICAL FIELD

The present disclosure relates to a driving assistance apparatus which assists driving of a driver.

BACKGROUND ART

There is conventionally known a technology which assists driving of a driver. For instance, Patent literature 1 discloses the following technology in a case where an image process recognizes a regulation sign board of no overtaking. When a driver performs a manipulation that is interpreted as a preparatory manipulation to overtake, the technology operates a driving assistance such as outputting warning or performing a driving assistance according to a vehicle position or situation.

PRIOR ART LITERATURES

Patent Literature

Patent literature 1: JP 2000-090393 A

SUMMARY OF INVENTION

The technology disclosed in Patent literature 1 may however cause the driver to hold the sense of incongruity if the driver does not remember correctly the content of the regulatory sign board. For example, suppose a case where a driver does not remember correctly the content of a regulatory sign board of no overtaking. In such a case, the driver does not assume that the overtaking is prohibited; this causes the driver to hold the sense of incongruity against the driving assistance prompting the driver not to overtake. As another example, suppose a case where a driver incorrectly remembers a regulatory sign board of no crossing over the lane marking line on the right for overtaking as a regulatory sign board of no overtaking. In such a case, the driver assumes that overtaking is prohibited; this may cause the driver to hold the sense of incongruity against the driving assistance which operates a running assistance for overtaking without crossing over the lane marking line on the right. Such the sense of incongruity may pose an unreasonable dissatisfaction or uneasiness against the driving assistance apparatus.

It is an object of the present disclosure to provide a driving assistance apparatus that reduces the sense of incongruity of a driver against a driving assistance in compliance with a traffic regulation even if the driver does not remember the traffic regulation correctly.

To achieve the above object, according to an aspect of the present disclosure, a driving assistance apparatus used in a vehicle is provided to include a regulation determiner section, an assistance operator section, and a presentation operator section. The regulation determiner section determines a present traffic regulation which is a traffic regulation in a running environment of the vehicle running. The assistance operator section operates a driving assistance that assists driving of a driver of the vehicle to comply with the present traffic regulation determined by the regulation determiner section. The presentation operator section operates a presentation of behavior reason information. Herein, when the assistance operator section operates the driving assistance to comply with the present traffic regulation corresponding to an attention traffic regulation that is liable to pose a mistake and stored in a regulation storage, the presentation operator section operates the presentation of the behavior reason information on a reason of a behavior of the vehicle resulting from the driving assistance operated by the assistance operator section to comply with the present traffic regulation corresponding to the attention traffic regulation.

Under the above configuration, when a driving assistance is operated to comply with a traffic regulation that is liable to pose a mistake, a presentation is operated which indicates the behavior reason information on a reason for a behavior of a host vehicle resulting from the driving assistance operated by the driving assistance apparatus. The driver can thus recognize the reason for the behavior of the host vehicle. Suppose a case that the driving assistance is operated to comply with a traffic regulation that the driver does not remember correctly and the host vehicle exhibits a behavior that is different from that assumed by the driver. Even in such a case, the driver can recognize the reason for the behavior. This can reduce the sense of incongruity of the driver against the driving assistance in compliance with the traffic regulation even if the driver does not remember the traffic regulation correctly.

BRIEF DESCRIPTION OF DRAWINGS

The above and other objects, features and advantages of the present disclosure will become more apparent from the following detailed description made with reference to the accompanying drawings. In the drawings:

FIG. 9 is a diagram illustrating an example of an instruction sign marking of "safety zone";

FIG. 10 is a diagram illustrating an example of division marking lines of "channelized zone";

FIG. 11 is a diagram illustrating an example of reducing presentation depending on a count of counting presentations of behavior reason information;

FIG. 13 is a diagram illustrating an example of reducing presentation depending on a count of counting presentations of behavior reason information;

FIG. 14 is a diagram illustrating an example of reducing presentation depending on a count of counting presentations of behavior reason information;

EMBODIMENTS FOR CARRYING OUT INVENTION

A plurality of embodiments and modification examples for disclosure are explained with reference to the drawings. To simplify the explanation, among the embodiments and modification examples, a second component having the same function as that of a first component illustrated in a drawing in the foregoing explanation is assigned with the same reference sign of the first component and may be omitted from the following explanation. The second component assigned with the same reference sign may refer to the explanation in foregoing embodiments and/or modification examples.

In addition, the following embodiments and modification examples are described as corresponding to the region where a left-hand traffic is legislated. If applied to the region where a right-hand traffic is legislated, the embodiments and modification examples are described as being left and right reversed.

First Embodiment

Figure 1:
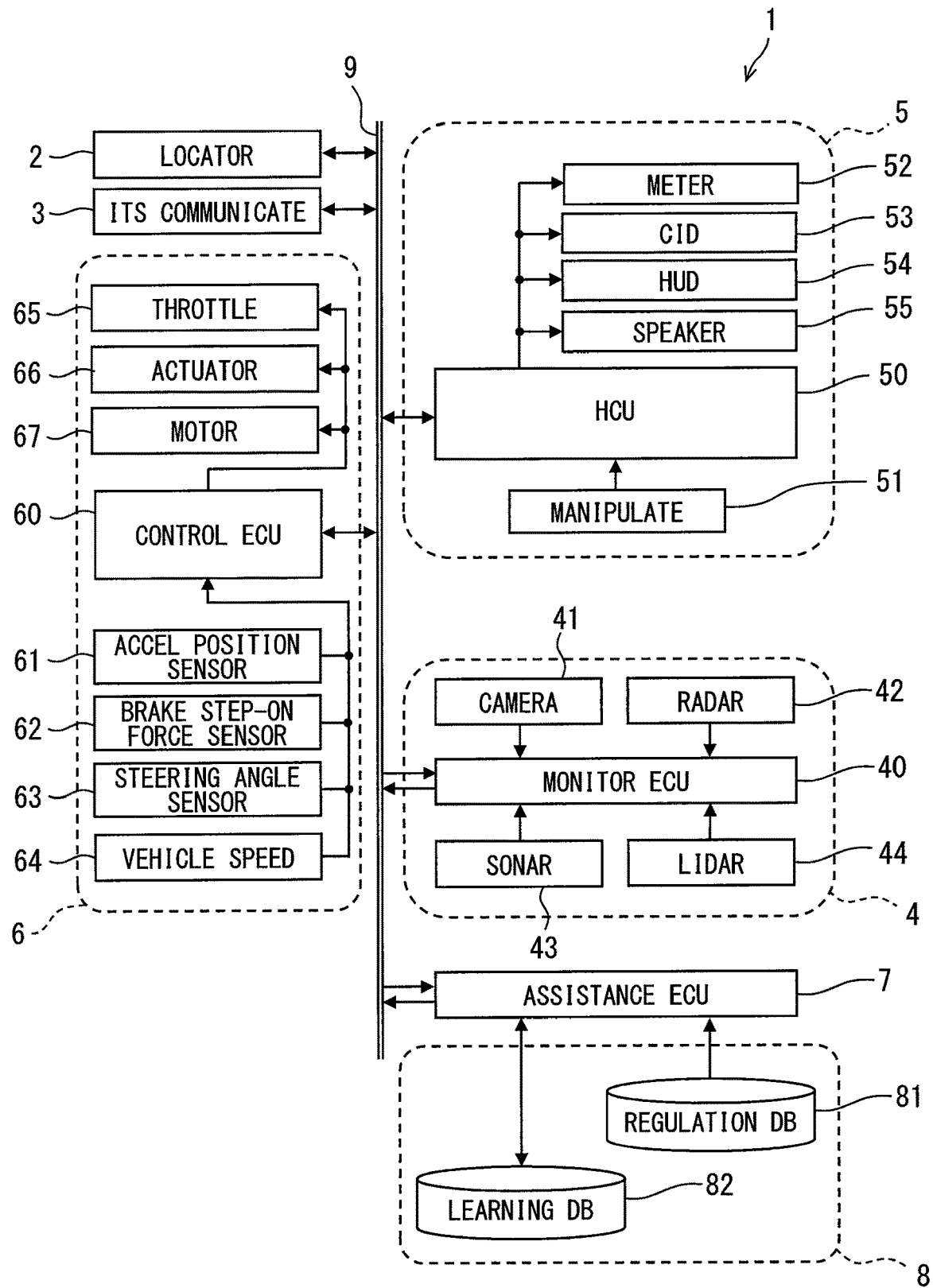
FIG. 1 is a block diagram illustrating an example of a schematic configuration of a driving assistance system according to a first embodiment.

The following explains a first embodiment of the present disclosure with reference to the drawings. A driving assistance system 1 illustrated in FIG. 1 is mounted in a vehicle. The driving assistance system 1 includes an ADAS (Advanced Driver Assistance Systems) locator 2, an ITS (Intelligent Transport Systems) communicator 3, a periphery monitoring system 4, an HMI (Human Machine Interface) system 5, a vehicle control system 6, a driving assistance ECU (Electronic Control Unit) 7, and a database (hereinafter, DB) 8. The ADAS locator 2, the ITS communicator 3, the periphery monitoring system 4, the HMI system 5, the vehicle control system 6, and the driving assistance ECU 7 are connected via an in-vehicle LAN 9, for instance, to exchange the information with each other by communication. Hereinafter, the vehicle mounted with the driving assistance system 1 is referred to as a host vehicle. In addition, the following refers to the host vehicle as a subject vehicle that is mounted with a driving assistance system 1 serving as a subject matter.

Note that "information," which may be used not only as an uncountable noun but also a countable noun, is equivalent to an informational item. One information is equivalent to one informational item; a plurality of informations are equivalent to a plurality of informational items. Further, "data" is used also as one data or a plurality of data. One data is equivalent to one data item; a plurality of data are equivalent to a plurality of data items.

The ADAS locator 2 includes (i) a GNSS receiver, (ii) inertia sensors such as a 3D gyro sensor, and (iii) a memory which stores a map data. The GNSS (Global Navigation Satellite System) receiver receives positioning signals from a plurality of artificial satellites. The 3D gyro sensor includes a three axis gyro sensor and a three axis acceleration sensor.

The ADAS locator 2 measures a position of the host vehicle by combining positioning signals received by the GNSS receiver and measurement results of the inertia sensors. The position of the host vehicle may be defined as coordinates of latitude and longitude, for example. The ADAS locator 2 reads from a memory map data, such as link data, node data, road shapes, road sign markings, structures in the course ahead of the host vehicle. The ADAS locator 2 then outputs the position of the host vehicle and the read map data in the course ahead of the host vehicle to the in-vehicle LAN 9, successively.

Link data relative to each link include a unique number (link ID) for specifying the link, a link length indicating a length of the link, a link direction, shape information on the link, node coordinates (latitude/longitude) of a starting end and a terminating end, and a road attribute. The road attribute includes a road name, a road class, a road width, the number of lanes, a regulated speed value. In contrast, node data relative to each node include a unique number (node ID) for specifying the node, node coordinates, a node name, a node class, connection link IDs for indicating links connected to the node, and an intersection class.

The ITS communicator 3 performs a wireless communication with an in-vehicle communicator mounted in a peripheral vehicle around the host vehicle and/or a roadside unit installed in a roadside. The ITS communicator 3 acquires the information such as the position information and the running speed information of a peripheral vehicle around the host vehicle, via a vehicle-to-vehicle communication by an in-vehicle communicator or a road-to-vehicle communication by a roadside unit. The ITS communicator 3 outputs the acquired information to the in-vehicle LAN 9.

The periphery monitoring system 4 includes: (i) periphery monitoring sensors such as a periphery monitoring camera 41, a milliwave radar 42, a sonar 43, and a LIDAR (Light Detection and Ranging/Laser Imaging Detection and Ranging) 44; and (ii) a periphery monitoring ECU 40. The periphery monitoring system 4 detects an obstacle such as a mobile object and a static object. The mobile object includes a pedestrian, an animal other than a human being, a bicycle, a motorcycle, or a different vehicle; the static object includes a falling object on a road, a guardrail, a curbstone, or a tree. The periphery monitoring system 4 further detects a lane division marking line, a color of a traffic light, a road marking sign, or a road sign board.

The HMI system 5 includes several display devices such as a combination meter 52, a CID (Center Information Display) 53, and an HUD (Head-Up Display) apparatus 54. The HMI system 5 further includes a manipulation device 51 and an audio speaker 55. The HMI system 5 receives an input manipulation from the driver of the host vehicle, or presents the information to the driver of the host vehicle.

The vehicle control system 6 includes (i) detection sensors that each detect a driving manipulation, such as an accelerator position sensor 61, a brake stepping-on force sensor 62, and a steering angle sensor 63; and (ii) a speed sensor 64 that detects a running state of the host vehicle. In addition, the vehicle control system 6 further includes (i) running control devices such as an electronically controlled throttle 65, a brake actuator 66, and an EPS (Electric Power Steering) motor 67; and (ii) a vehicle control ECU 60. The vehicle control system 6 controls the running of the host vehicle based on the driving manipulation by the driver, or instructions from the driving assistance ECU 7.

The driving assistance ECU 7, which includes a CPU, a volatile memory, a nonvolatile memory, an I/O, and a bus that connects the foregoing, executes various processes by executing control programs stored in the nonvolatile memory. All or part of the functions executed by the driving assistance ECU 7 may be configured as hardware circuits such as one or more ICs.

The driving assistance ECU 7 controls the vehicle control ECU 60, thereby executing a plurality of driving assistance applications which perform assistance or vicarious execution of driving manipulation by the driver. The driving assistance ECU 7 will be explained in detail later.

The DB 8 stores the data used by the driving assistance ECU 7. The DB 8 includes a regulation DB 81 and a learning DB 82. The regulation DB 81 stores traffic regulations (hereinafter, attention traffic regulations) that the driver tends to mistakenly remember. This traffic regulation includes not only a regulation determined by law but also a regulation which is recommended to comply with. The regulation DB 81 is equivalent to a regulation storage.

Examples of the attention traffic regulations include traffic regulations expressed by regulatory sign boards such as "no overtaking," "no crossing over lane marking line on the right for overtaking" "sounding horn," and "road segment for sounding horn." Examples further include traffic regulations expressed by regulatory sign markings such as "no stopping region", "restricted region"; traffic regulations expressed by instruction sign markings such as "safety zone"; and traffic regulations expressed by division marking lines such as "channelized zone (zebra zone or buffer zone)." Further, examples include traffic regulations such as "regulated not to continue running overtaking lane," "regulated to temporarily halt at intersection having no traffic signal when entering from non-priority road."

The learning DB 82 will be explained later. The regulation DB 81 and the learning DB 82 may be configured to be stored in not only respective different storage media, but also collectively in an identical storage medium.

<Schematic Configuration of Peripheral Monitoring System 4>

The following explains a schematic configuration of the periphery monitoring system 4. The periphery monitoring system 4 includes a periphery monitoring ECU 40, a periphery monitoring camera 41, a milliwave radar 42, a sonar 43, and a LIDAR 44.

The periphery monitoring camera 41 is a camera with a single lens or plural lenses, capturing images of the periphery of the host vehicle successively. The following explains an example configuration where the periphery monitoring camera 41 includes at least a front camera. Note that another configuration may be provided where the periphery monitoring camera 41 includes a camera capturing images of other areas other than a front area, such as a rear camera having a capture range of a predetermined range rearward of the host vehicle.

The periphery monitoring camera 41, which turns the optical axis to a road surface ahead of the host vehicle, is installed in a room mirror of the host vehicle, for instance. The peripheral monitoring camera 41 captures an image of a range of about 80 meters from the host vehicle with a horizontal viewing angle of about 45 degrees. The peripheral monitoring camera 41 captures images successively and outputs the data of the capture images successively to the periphery monitoring ECU 40.

The milliwave radar 42 sends out the millimeter wave or the submillimeter wave around the host vehicle successively, and receives the reflected wave reflected by an obstacle successively. The milliwave radar 42 outputs a scanning result based on the received signal to the periphery monitoring ECU 40 successively.

The sonar 43 sends out the ultrasonic wave around the host vehicle successively, and receives the reflected wave reflected by an obstacle successively. The sonar 43 outputs a detection result based on the received signal to the periphery monitoring ECU 40 successively.

The LIDAR 44 sends out the laser light around the host vehicle successively, and receives the reflected light reflected by an obstacle successively. The LIDAR 44 outputs a scanning result based on the received signal to the periphery monitoring ECU 40 successively.

The periphery monitoring ECU 40, which includes a CPU, a volatile memory, a nonvolatile memory, an I/O, and a bus that connects the foregoing, executes various processes by executing control programs stored in the nonvolatile memory. All or part of the functions executed by the periphery monitoring ECU 40 may be configured as hardware circuits such as one or more ICs.

The periphery monitoring ECU 40 recognizes a running environment of the host vehicle that is running from the sensing result by the periphery monitoring sensors. The periphery monitoring ECU 40 may be configured to acquire the data of capture image from the periphery monitoring camera 41, and detect data with respect to an object present around the host vehicle based on the acquired data; the detected data include a distance from the host vehicle, a relative position with the host vehicle, and a relative speed with the host vehicle. For instance, a known image recognition process such as a template matching may be used to detect as a detection target an object including a pedestrian or a vehicle such as an automobile, a bicycle, a motorcycle. In addition, a configuration may be provided where the image recognition process determines a kind of a vehicle such as a school bus.

Note that when a camera with a single lens is used, a relative position of an object with the host vehicle and a distance between an object and the host vehicle may be determined from (i) an installed position and a direction of an optical axis of the periphery monitoring camera 41 relative to the host vehicle and (ii) a position of the object in the capture image. When a camera with plural lenses is used, the distance between the host vehicle and the object may be determined based on the parallax amount of a pair of camera lenses. Furthermore, a relative speed of the object with the host vehicle may be determined from a change rate of the distance between the host vehicle and the object. When the detected object is a vehicle the position of which is a front area relative to the host vehicle, it may be regarded as a preceding vehicle, for example.

The periphery monitoring ECU 40 further detects a road sign board and a road sign marking from the data of the capture image acquired from the periphery monitoring camera 41 with the image recognition process. Of the road sign board and the road sign marking, the distance from the host vehicle, the relative position with the host vehicle, or the relative speed with the host vehicle may be detected, similarly to the above mentioned.

Further, the periphery monitoring ECU 40 may be configured to detect lane division marking lines and the positions of the lane division marking lines relative to the host vehicle, from the data of the capture image acquired from the periphery monitoring camera 41. The lane division marking line may be detected with a well-known image recognition process such as an edge detection. The position of the lane division marking line relative to the host vehicle may be detected from (i) the installed position and the direction of the optical axis of the periphery monitoring camera 41 relative to the host vehicle and (ii) the position of the object in the capture image. The LIDAR 44 may be configured to detect the lane division marking line and the position of the lane division marking line relative to the host vehicle.

Further, the periphery monitoring ECU 40 may be configured to detect data of an object around the host vehicle by using the milliwave radar 42, the sonar 43, and the LIDAR 44; the data of the object include a distance from the host vehicle, a relative position with the host vehicle, and a relative speed with the host vehicle.

The periphery monitoring ECU 40 detects an object based on the reception intensity of the reflected waves which are produced by the object reflecting the search waves transmitted from the milliwave radar 42, the sonar 43, or the LIDAR 44. Furthermore, the periphery monitoring ECU 40 detects the distance between the host vehicle and the object from a period of time from when transmitting the search waves to when receiving the reflected waves. In addition, the periphery monitoring ECU 40 detects the direction of the object relative to the host vehicle from the direction from which the search waves producing the reflection waves are sent out, further detecting the relative position of the object to the host vehicle from the distance between the host vehicle and the object, and the direction of the object relative to the host vehicle.

In addition, the periphery monitoring ECU 40 detects the relative speed of the object with the host vehicle with a known technology, based on the Doppler shift between the reflected waves and the search waves sent out. Further, the relative speed of the object with the host vehicle may be detected from the time-based change rate of the distance between the host vehicle and the object. The periphery monitoring ECU 40 outputs various kinds of detected information to the in-vehicle LAN 9 as monitoring information.

The periphery monitoring ECU 40 may recognize a running environment of the host vehicle using other than the sensing result by the periphery monitoring sensors. For example, the periphery monitoring ECU 40 may detect a presently running lane that is a lane the host vehicle is presently running from the position of the host vehicle acquired from the ADAS locator 2, and the map data such as the number of lanes in the course ahead, and road shape. Further, the periphery monitoring ECU 40 may detect the presence of a peripheral vehicle, and the distance, the position, and the speed of the peripheral vehicle relative to the host vehicle, by using the position information and the running speed information of the peripheral vehicle, which are acquired from the ITS communicator 3.

In addition, with respect to the periphery monitoring system 4, the number of periphery monitoring sensors, the kind, or the combination of kinds are not limited to the examples described in the first embodiment. For instance, another configuration may be provided where a plurality of kinds of periphery monitoring sensors have an identical sensing range, such that a front area relative to the host vehicle is sensed by a camera and a milliwave radar that are used together.

<Schematic Configuration of HMI System 5>

The following explains a schematic configuration of the HMI system 5. The HMI system 5 includes an HCU (Human Machine Interface Control Unit) 50, a manipulation device 51, a combination meter 52, a CID 53, an HUD apparatus 54, and an audio speaker 55.

The manipulation device 51 includes switches that the driver of the host vehicle manipulates. For example, the manipulation device 51 includes a steering switch provided in a spoke part of the steering wheel of the host vehicle. The steering switch is used to perform the various setups including the setup in which the driver sets up the necessity or not of the activation of a driving assistance application to be mentioned later.

The combination meter 52 is arranged in front of the driver seat in the occupant compartment of the host vehicle. The CID 53 is arranged above a center cluster in the occupant compartment of the host vehicle. The combination meter 52 and the CID 53 each display the various images for the information notice on a display screen based on the image data obtained from the HCU 50.

The HUD apparatus 54 projects a display picture, which is formed in the display element based on the image data acquired from the HCU 50, onto the windshield of the host vehicle, thereby displaying a virtual image of the display picture to be visually recognized in superimposition onto a front external scenery from the occupant compartment of the host vehicle. The HUD apparatus 54 presents the information to the driver by using a display object displayed as the virtual image.

The audio speaker 55, which is installed, e.g., within the lining of a door of the host vehicle, reproduces a sound or a speech to be able to be heard by the driver of the host vehicle. In detail, the audio speaker 55 outputs a synthesized sound such as a mechanical beep sound or a message. The audio speaker 55 can thus present the information to the driver by using the reproduced sound or speech.

The HCU 50, which includes a CPU, a volatile memory, a nonvolatile memory, an I/O, and a bus that connects the foregoing, implements various processes by executing control programs stored in the nonvolatile memory. All or part of the functions implemented by the HCU 50 may be configured as hardware circuits such as one or more ICs.

The HCU 50 controls the combination meter 52, the CID 53, the HUD apparatus 54, and the audio speaker 55 to present the information, thereby operating the information presentation to the driver. Further, the HCU 50 outputs a signal according tor a switch manipulation via the manipulation device 51, to the in-vehicle LAN 9.

<Schematic Configuration of Vehicle Control System 6>

The following explains a schematic configuration of the vehicle control system 6. The vehicle control system 6 includes a vehicle control ECU 60, an accelerator position sensor 61, a brake stepping-on force sensor 62, a steering angle sensor 63, a vehicle speed sensor 64, an electronically controlled throttle 65, a brake actuator 66, and an EPS motor 67.

The accelerator position sensor 61 detects an amount of the stepping-on of the accelerator pedal by the driver, and outputs it to the vehicle control ECU 60. The brake stepping-on force sensor 62 detects an amount of the stepping-on of the brake pedal by the driver, and outputs it to the vehicle control ECU 60. The steering angle sensor 63 detects, as a steering angle, a steering wheel angle or a turning angle. The vehicle speed sensor 64 measures a rotation speed of the output axis of the transmission or the axle, thereby detecting a current running speed of the host vehicle and outputting it to the vehicle control ECU 60.

The electronically controlled throttle 65 controls an opening degree of the throttle based on the control signal outputted from the vehicle control ECU 60. The brake actuator 66 controls a braking force that is generated in each wheel due to an occurrence of a braking pressure based on the control signal outputted from the vehicle control ECU 60. The EPS motor 67 controls a force to steer and a force to hold steering which are applied to the steering mechanism based on the control signal outputted from the vehicle control ECU 60.

The vehicle control ECU 60 is an electronic control unit which performs acceleration and deceleration control and/or steering control of the host vehicle. The vehicle control ECU 60 includes a steering ECU which performs steering control, a power unit control ECU which performs acceleration and deceleration control, and a brake ECU. The vehicle control ECU 60 acquires detection signals from sensors mounted in the host vehicle such as the accelerator position sensor 61, the brake stepping-on force sensor 62, the steering angle sensor 63, or the vehicle speed sensor 64, and outputs a control signal to running control devices such as the electronically controlled throttle 65, the brake actuator 66, and the EPS motor 67. The vehicle control ECU 60 performs an acceleration and deceleration control and/or a steering control of the host vehicle in compliance with an instruction from the driving assistance ECU 7 at the time of executing a driving assistance application. In addition, the vehicle control ECU 60 outputs detection signals from the above respective sensors 61 to 64, to the in-vehicle LAN 9.

<Schematic Configuration of Driving Assistance ECU 7>

Figure 2:
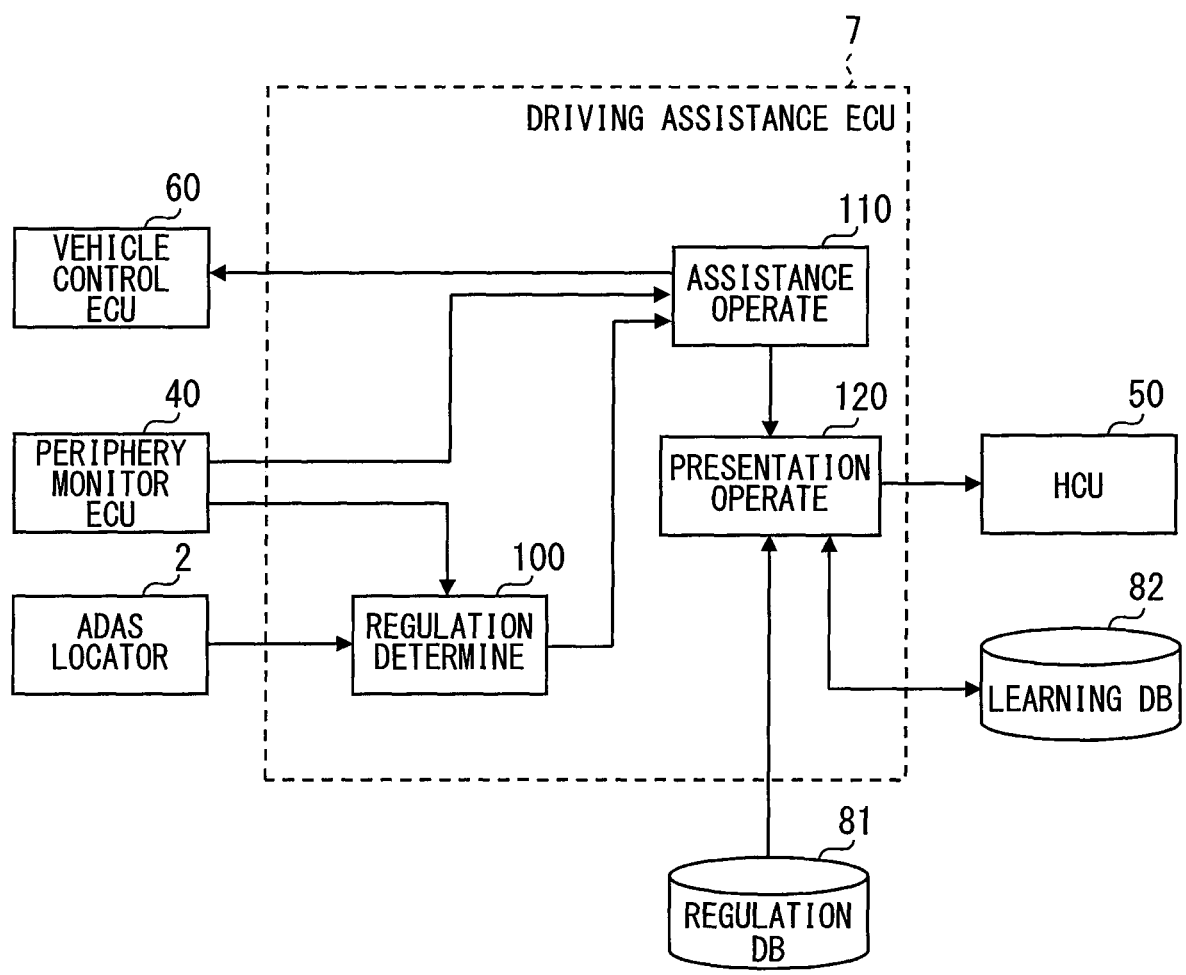
FIG. 2 is a diagram illustrating an example of a schematic configuration of a driving assistance ECU.

The following explains a schematic configuration of the driving assistance ECU 7 with reference to FIG. 2. The driving assistance ECU 7 includes a regulation determiner section 100, an assistance operator section 110, and a presentation operator section 120 (also referred to as a presentation controller section), as indicated in FIG. 2. The driving assistance ECU 7 is equivalent to a driving assistance apparatus.

The regulation determiner section 100 determines a traffic regulation (hereinafter, a present traffic regulation) in the present running environment of the host vehicle based on the information acquired from the ADAS locator 2 and/or the periphery monitoring ECU 40. The running environment of the host vehicle includes the position of the host vehicle, the road segment in which the host vehicle runs, the lane in which the host vehicle runs, the positional relation between the host vehicle and an object around the host vehicle.

For example, when acquiring the monitoring information such as the display of a road sign board or a road sign marking from the periphery monitoring ECU 40, the regulation determiner section 100 determines the traffic regulation expressed by the road sign board or the road sign marking as the present traffic regulation. An example of determining the traffic regulation expressed by the road sign board or the road sign marking includes referencing a table in which road sign boards or road sign markings are associated with traffic regulations. This table may be stored in a regulation DB 81, for example. When the periphery monitoring ECU 40 is able to recognize a traffic regulation expressed by the road sign board or road sign marking, the recognition result may be used to determine the traffic regulation.

Figure 3:
FIG. 3 is a diagram illustrating an example of a regulatory sign board of "no overtaking"
Figure 4:
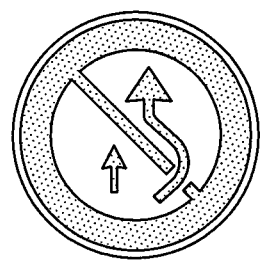
FIG. 4 is a diagram illustrating an example of a regulatory sign board of "no crossing over lane marking line on the right for overtaking"
Figure 5:
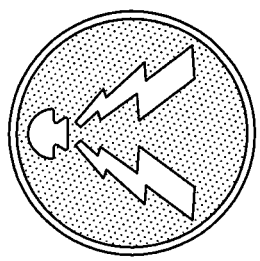
FIG. 5 is a diagram illustrating an example of a regulatory sign board of "sounding horn"
Figure 6:
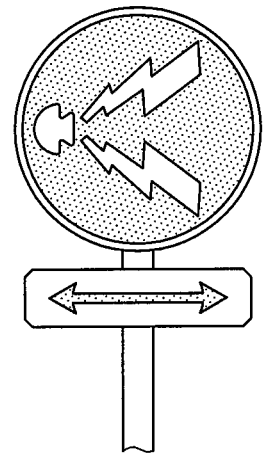
FIG. 6 is a diagram illustrating an example of a regulatory sign board of "road segment for sounding horn"

Examples of the traffic regulations expressed by road sign boards are as follows. "No overtaking" of the regulatory sign board in FIG. 3 indicates "no overtaking" of the traffic regulation. "No crossing over lane marking line on right for overtaking" of the regulatory sign board in FIG. 4 indicates "no crossing over the lane marking line on the right for overtaking" of the traffic regulation. The content of this regulation expressed by this regulatory sign board signifies "overtaking is permitted when a condition is satisfied which provides a gap of not less than one meter with the vehicle overtaken without crossing over the lane marking line on the right; overtaking is unpermitted when the above condition is not satisfied." "Sounding horn" of the regulatory sign board in FIG. 5 indicates "sounding horn" of the traffic regulation. "Road segment for sounding horn" of the regulatory sign board in FIG. 6 indicates "road segment for sounding the horn" of the traffic regulation. The content of this regulation expressed by this regulatory sign board signifies "sounding the horn when the road segment for sounding the horn provides a poor visibility." Other than the above, the traffic regulations expressed by the road sign boards may be as follows. "Highest speed" of the regulatory sign board indicates "highest speed" of the traffic regulation. "Temporary halt" of the regulatory sign board indicates "temporary halt".

Figure 7:
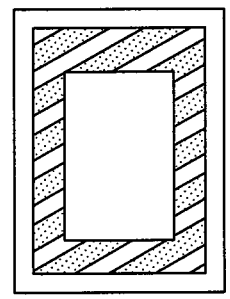
FIG. 7 is a diagram illustrating an example of a regulatory sign marking of "no stopping region"
Figure 8:
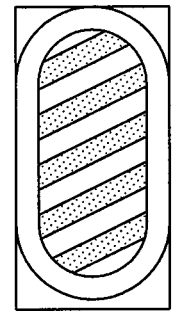
FIG. 8 is a diagram illustrating an example of a regulatory sign marking of "restricted region"

Example of the traffic regulations expressed by the road sign markings are as follows. "No stopping region" of the regulatory sign marking in FIG. 7 indicates "no stopping region" of the traffic regulation. This regulatory sign marking signifies "entering no stopping region is permitted, but stopping in no stopping region is unpermitted." "Restricted region" of the regulatory sign marking in FIG. 8 indicates "restricted region" of the traffic regulation. This regulatory sign marking signifies "entering the restricted region is unpermitted." "Safety zone" of the regulatory sign marking in FIG. 9 indicates "safety zone" of the traffic regulation. This regulatory sign marking signifies "entering the safety zone is unpermitted, and parking in the range within 10 meters around the safety zone is unpermitted." "Channelized zone" of the division marking lines indicates "recommended not to enter the channelized zone, but permitted" of the regulation.

In addition, traffic regulations other than those expressed by the road sign boards and road sign markings are also determined as present traffic regulations based on the information acquired from the ADAS locator 2 and/or the periphery monitoring ECU 40. One example is a method of referencing a table which associates situations where the host vehicle is subjected with the contents of traffic regulations indicated by the respective situations. This table may be stored in a regulation DB 81, for example.

An example of such determination is as follows. Suppose a case where the lane in which the host vehicle runs is an overtaking lane and another vehicle is not present in a driving lane within a sensing range of a periphery monitoring sensor. Such a case is determined as corresponding to a traffic regulation of "regulated not to continue running in the overtaking lane." The lane in which the host vehicle runs and whether another vehicle is present in the driving lane within the sensing range of the periphery monitoring sensor may be determined based on the monitoring information acquired from the periphery monitoring ECU 40.

Another example is as follows. Suppose a case where the host vehicle enters an intersection without a traffic signal from a non-priority road. Such a case is determined as corresponding to a traffic regulation of "regulated to halt temporarily at intersection having no traffic signal when entering from non-priority road." Whether a traffic signal is present and the running of the non-priority road may be determined from the position of the host vehicle acquired from the ADAS locator 2, and the map data for the course ahead of the host vehicle. The non-priority road may be determined by the comparison with an intersecting road in respect of the number of lanes or road width, etc.

The assistance operator section 110 performs an operation/process about a driving assistance. The assistance operator section 110 implements the control program stored in the nonvolatile memory of the driving assistance ECU 7, thereby configuring functional blocks including an ACC (Adaptive Cruise Control), an LKA (Lane Keeping Assist), an LCA (Lane Change Assist), an AEB (Autonomous Emergency Braking), and a function of automatically sounding a horn.

The ACC causes the vehicle control ECU 60 to adjust the driving force and the braking force based on the monitoring information of a preceding vehicle acquired from the periphery monitoring ECU 40, thereby controlling the running speed of the host vehicle. When any preceding vehicle is not detected, the ACC makes the host vehicle run with a constant speed of a target running speed set by the driver via the manipulation device 51. In contrast, when a preceding vehicle is detected, the ACC sets a target running speed as the speed of the preceding vehicle while setting a target inter-vehicle distance up to the preceding vehicle according to the target running speed. The ACC then causes the host vehicle to perform a tracking travel to follow the preceding vehicle while controlling the acceleration and deceleration to match with the target inter-vehicle distance. The speed of the preceding vehicle may be acquired from (i) the relative speed of the preceding vehicle with the host vehicle detected by the periphery monitoring ECU 40, and (ii) the vehicle speed of the host vehicle acquired from the signal of the vehicle speed sensor 64 of the host vehicle.

The LKA causes the vehicle control ECU 60 to adjust the steering force, thereby controlling the steering angle of the steering tire-wheel of the host vehicle. The LKA generates the steering force to the direction so as to prevent a close approach to the lane division marking line, thereby maintaining the host vehicle within the present lane the host vehicle is presently running. A driving assistance application which maintains the host vehicle within the present lane the host vehicle is presently running may be configured to use a driving assistance application which controls the steering angle to meet a target running locus calculated previously.

The AEB causes the vehicle control ECU 60 to adjust the braking force based on the monitoring information on an area in front of the host vehicle acquired from the periphery monitoring ECU 40, thereby forcibly decreasing the running speed of the host vehicle automatically. As a specific example, an automatic decrease of the vehicle speed of the host vehicle is operated forcibly when an emergency control condition is satisfied by TTC (time to collision) to an object ahead of the host vehicle becoming less than a set value, e.g., five seconds.

The LCA moves the host vehicle from the presently running lane to an adjacent lane. The LCA causes the vehicle control ECU 60 to move the host vehicle to an adjacent lane by generating the steering force to the direction so as to allow the host vehicle to move to the adjacent lane. Movement to an adjacent lane may be configured to need an approval by the driver, or configured not to need an approval by the driver.

The function of automatically sounding a horn causes a body ECU to sound a horn when the present traffic regulation which is determined by the regulation determiner section 100 is "sounding horn." When the present traffic regulation determined by the regulation determiner section 100 is "road segment for sounding horn," the body ECU is caused to sound a horn in response to that the monitoring information ahead of the host vehicle acquired from the periphery monitoring ECU 40 indicates that the road segment ahead of the host vehicle provides a poor visibility. The monitoring information ahead of the host vehicle indicating that the road segment ahead of the host vehicle provides a poor visibility corresponds to a case where an obstacle detected by the periphery monitoring ECU 10 reduces the visual field in the course ahead of the host vehicle. The determination that the course ahead of the host vehicle provides a poor visibility may be configured to be made based on the road shape acquired by the ADAS locator 2.

Further, the assistance operator section 110 may be configured to execute another driving assistance such as a BSM (Blind Spot Monitor), which reports presence of a different vehicle in a rear and left area and a rear and right area relative to the host vehicle to the driver, based on the monitoring information in a rear and left area and a rear and right area relative to the host vehicle acquired from the periphery monitoring ECU 40.

The first embodiment explains the following case with examples. The explained case is that the assistance operator section 110 executes a plurality of driving assistance applications, thereby operating the driving assistances that include automatic driving of all controls of an acceleration control, a braking control, and a steering control of the host vehicle in a predetermined road segment, and automatic sounding of a horn. Note that an automatic driving may be configured to be achieved by a method other than the method executing the plurality of driving assistance applications.

Further, the assistance operator section 110 executes the driving assistance application so as to comply with the present traffic regulation determined by the regulation determiner section 100. Examples are as follows. Suppose a case that the present traffic regulation is "no overtaking. In such a case, even if the inter-vehicle distance between the preceding vehicle and the host vehicle is too close so that the assistance operator section 110 determines that overtaking the preceding vehicle is under a desirable situation, the automatic driving of overtaking a preceding vehicle is not operated.

Suppose a case that the present traffic regulation is "no crossing over lane marking line on the right side for overtaking." In such a case, the host vehicle is operated depending on whether a condition is satisfied which provides a gap of not less than one meter with the vehicle overtaken without crossing over the lane marking line on the right. When overtaking the preceding vehicle is in a desirable situation and the above condition is satisfied, the host vehicle is caused to overtake the preceding vehicle. In contrast, when overtaking the preceding vehicle is in a desirable situation but the above condition is not satisfied, the host vehicle is not caused to overtake the preceding vehicle.

When the present traffic regulation is "no stopping region," the host vehicle is regulated to pass through such no stopping region. When the present traffic regulation is "restricted region," the host vehicle is subjected to the automatic steering control to pass through such restricted region to avoid the restricted region. When the present traffic regulation is "safety zone," the host vehicle is subjected to the automatic steering control to avoid such safety zone. When the present traffic regulation is "channelized zone," the host vehicle is decelerated or stopped so as to allow a different vehicle to pass with a priority in the case where the host vehicle runs in the lane adjacent to the channelized zone and joins with the different vehicle running in the channelized zone.

When the present traffic regulation is "regulated not to continue running an overtaking lane," the host vehicle is caused to move to the driving lane. When the present traffic regulation is "sounding horn" or "road segment for sounding horn," the behavior of the host vehicle is the same as the above-mentioned. The present traffic regulation is "regulated to halt temporarily at intersection having no traffic signal when entering from non-priority road" or "temporary halt", the host vehicle is caused to be halted temporarily in the temporary halt position. When the present traffic regulation is "highest speed," the speed of the host vehicle is restricted to the speed in compliance with a speed restriction value.

The presentation operator section 120 operates the presentation of the behavior reason information when the present traffic regulation determined by the regulation determiner section 100 corresponds to an attention traffic regulation stored in the regulation DB 81. The behavior reason information is the information which indicates the reason for a behavior of the host vehicle resulting from the driving assistance that is operated to comply with the present traffic regulation determined by the regulation determiner section 100. The presented behavior reason information is determined based on (i) the present traffic regulation determined by the regulation determiner section 100, and (ii) the behavior of the host vehicle resulting from the driving assistance by the assistance operator section 110 to comply with the present traffic regulation. The information of the present traffic regulation and the information of the behavior of the host vehicle resulting from the driving assistance to comply with the present traffic regulation may be configured to be acquired by the presentation operator section 120 from the assistance operator section 110.

The presentation operator section 120 transmits an instruction to the HCU 50 to present the behavior reason information via a display device, and/or the audio speaker 55. The presentation is performed with at least one of a text display from the display device, an icon display from the display device, and a speech output from the audio speaker 55.

Examples of the presentation of the behavior reason information are as follows. When the present traffic regulation is "no overtaking" and the automatic driving does not operate the overtaking, the behavior reason information such as "overtaking is not operated since no overtaking" is presented. When the present traffic regulation is "no crossing over lane marking line on the right," the behavior reason information is presented differently depending on whether a condition is satisfied which provides a gap of not less than one meter with the vehicle overtaken without crossing over the lane marking line on the right. For example, when the condition is satisfied and the automatic driving operates overtaking, "operating overtaking since the host vehicle does not cross over the lane marking line on the right." In contrast, when the condition is not satisfied and the automatic driving does not operate overtaking, "to comply with a regulation, overtaking is not operated because the host vehicle crosses over the lane marking line on the right."

When the present traffic regulation is "no stopping region" and the automatic driving performs passing through such no stopping region, the behavior reason information such as "overtaking is operated because entering is not unpermitted" is presented. When the present traffic regulations is "restricted region," and the automatic driving operates passing through by avoiding such restricted region, the behavior reason information such as "overtaking is operated by avoiding restricted region because entering is prohibited" is presented. Also when the present traffic regulation is "safety zone" and the automatic driving operates passing through by avoiding such safety zone, the behavior reason information such as "overtaking is operated by avoiding restricted region because entering is prohibited" is presented.

When the present traffic regulation is "channelized zone" and the host vehicle running the lane adjacent to such channelized zone is regulated to give way to a different vehicle that is joining with the host vehicle and running the channelized zone, the behavior reason information such as "giving way to a vehicle running straight the channelized zone because such a vehicle is prioritized" is presented.

When the present traffic regulation is "sounding horn" and the horn is sounded, the behavior reason information such as "sounding the horn because the road sign board regulates" is presented. When the present traffic regulation is "road segment for sounding horn," the behavior reason information is presented differently depending on whether the course ahead of the host vehicle provides a poor visibility. For example, when the course provides a sufficient visibility and the horn is not sounded, the behavior reason information such as "the horn is not sounded because a sufficient visibility is provided." In contrast, when the course provides a poor visibility and the horn is sounded, the behavior reason information such as "the horn is sounded because a poor visibility is provided." When the present traffic regulation is "regulated not to continue running an overtaking lane" and the automatic driving operates a lane change to move to the driving lane, the behavior reason information such as "returning to the driving lane because continuing running the overtaking lane is unpermitted." The present traffic regulation is "regulated to halt temporarily at intersection having no traffic signal when entering from non-priority road" and the automatic driving operates a temporary halt when entering such an intersection, the behavior reason information such as "temporarily halt because of entry from the non-priority road."

In addition, when presenting the behavior reason information, the presentation operator section 120 records a presentation count of counting presentations of the behavior reason information in the learning DB 82 depending on respective association relations (hereinafter, referred to as instances) between the present traffic regulations determined by the regulation determiner section 100 and the behaviors of the host vehicle resulting from the driving assistance by the assistance operator section 110 so as to comply with the present traffic regulations.

When presenting the behavior reason information, the presentation operator section 120 references the presentation count of the behavior reason information depending on the respective instances recorded in the learning DB 82; thereby, as the presentation count is increased with respect to an identical instance, the presentation of the behavior reason information with respect to such an identical instance is reduced.

An example of reducing the presentation depending on the presentation count of the behavior reason information may be configured to decrease a frequency in operating the presentations as the presentation count is increased, as illustrated in FIG. 11. That is, the presentation frequency is set to be each time when the presentation count is less than 4 times. The presentation frequency is set to be one time per two times when the presentation count is equal to or greater than four times and less than ten times. The presentation frequency is set to be one time per five times when the presentation count is equal to or greater than ten times. Note that FIG. 11 is just an example configuration. Another configuration may be provided as long as satisfying the relation of decreasing the frequency in presenting the behavior reason information as the presentation count is increased.

<Behavior Reason Presentation Related Process>

Figure 12:
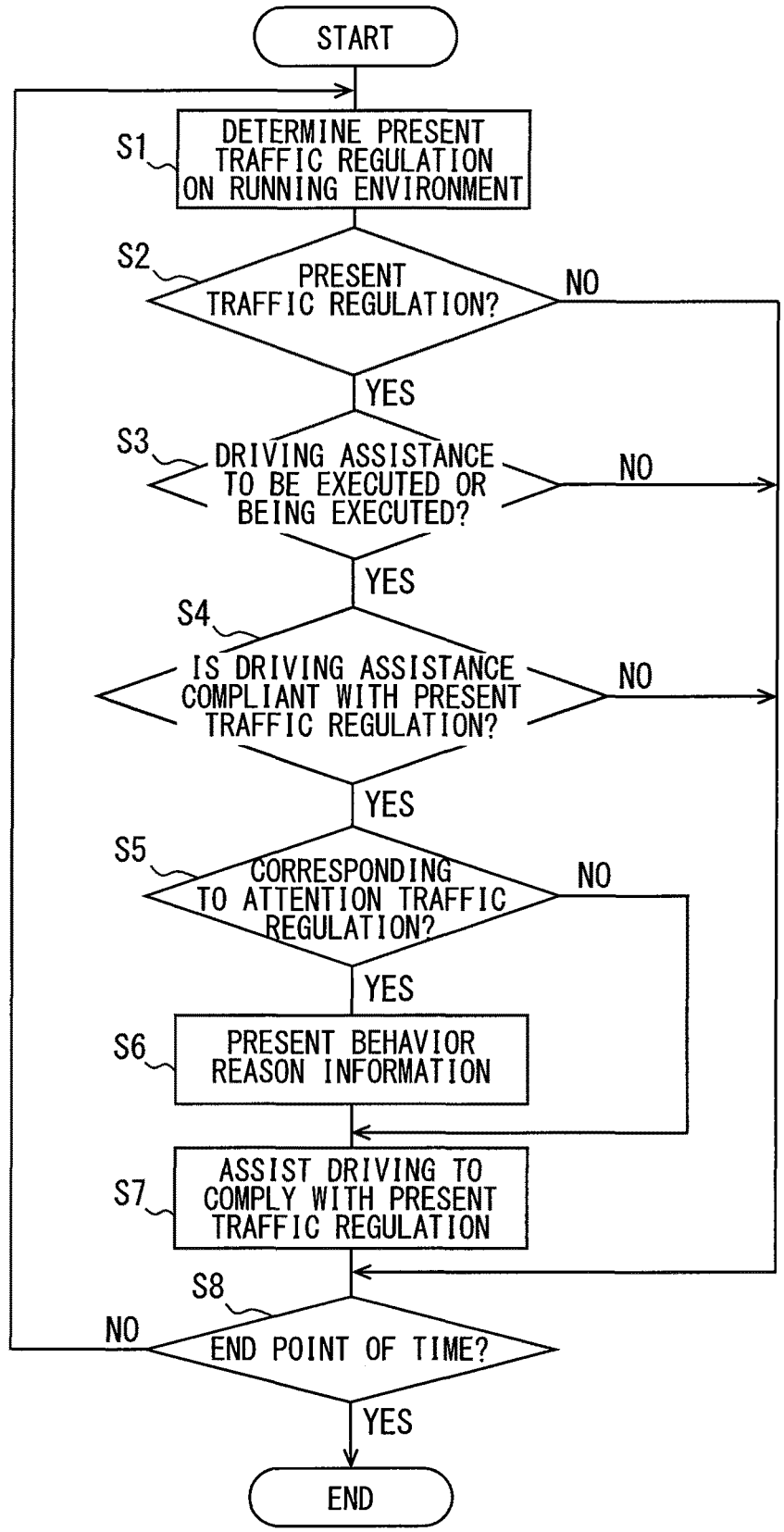
FIG. 12 is a flowchart illustrating an example of a sequence of a behavior reason presentation related process by a driving assistance ECU.

The following explains an example of a sequence of a process (hereinafter, referred to as a behavior reason presentation related process) that is relative to the presentation of the behavior reason information by the driving assistance ECU 7 with reference to a flowchart of FIG. 12. The flowchart in FIG. 12 may be configured to be started when the ignition power source of the host vehicle is turned into ON state, for instance.

It is further noted that a flowchart to be described includes sections (also referred to as steps), which are represented, for instance, as S1. Further, each section can be divided into several sections while several sections can be combined into a single section. Each section may be referred to as a device or a specific name, or with a structure modification; for instance, a regulation determiner section may be also referred to as a regulation determiner device or a regulation determiner. Further, each section can be achieved not only (i) as a software section in combination with a hardware unit (e.g., computer), but also (ii) as a section of a hardware circuit (e.g., integrated circuit, hard-wired logic circuit), including or not including a function of a related apparatus. Further, the section of the hardware circuit may be inside of a microcomputer.

First, at S1, the regulation determiner section 100 determines a traffic regulation (i.e., a present traffic regulation) in a running environment of the host vehicle that is running. When the present traffic regulation is determined at S1 and the present traffic regulation is present in the running environment of the host vehicle (S2: YES), the sequence proceeds to S3. In contrast, when the present traffic regulation is determined at S1 and the present traffic regulation is not present in the running environment of the host vehicle (S2: NO), the sequence proceeds to S8.

When the assistance operator section 110 operates the driving assistance, or when the assistance operator section 110 is operating the driving assistance (S3: YES), the sequence proceeds to S4. When the assistance operator section 110 does not operate the driving assistance and the assistance operator section 110 is not operating the driving assistance (S3: NO), the sequence proceeds to S8. The case where the assistance operator section 110 operates the driving assistance corresponds to the case where the assistance operator section 110 executes the driving assistance application based on the present traffic regulation determined at S1. The case where the assistance operator section 110 is operating the driving assistance corresponds to the case where the automatic driving is operated before the present traffic regulation is determined at S1.

When the assistance operator section 110 needs to operate the driving assistance complying with the present traffic regulation determined at S1 (S4: YES), the sequence proceeds to S5. In contrast, when the assistance operator section 110 does not need to operate the driving assistance complying with the present traffic regulation determined at S1 (S4: NO), the sequence proceeds to S8.

An example of determining that the driving assistance complying with the present traffic regulation is not needed to be operated (S4: NO) is as follows. The example is a case where although the present traffic regulation is "no overtaking," the host vehicle runs smoothly without the inter-vehicle distance with the preceding vehicle being too small so that overtaking the preceding vehicle is not needed. Another example includes a case where although the present traffic regulation is "restricted region," the host vehicle can pass by such restricted region while not entering the restricted region without need to operate the steering control of the host vehicle to avoid the restricted region.

At S5, the presentation operator section 120 determines whether the present traffic regulation corresponds to an attention traffic regulation stored in the regulation DB 81. When corresponding to an attention traffic regulation (S5: YES), the sequence proceeds to S6. In contrast, when not corresponding to an attention traffic regulation (S5: NO), the sequence proceeds to S7.

At S6, the presentation operator section 120 presents the behavior reason information based on the behavior of the host vehicle by the driving assistance operated by the assistance operator section 110 to comply with the present traffic regulation. An example of the presentation of the behavior reason information is as mentioned above. In addition, in cases that the behavior reason information is presented, as the presentation count is increased with respect to an identical instance, the presentation of the behavior reason information with respect to such an identical instance is preferably reduced.

At S7, the assistance operator section 110 instructs the vehicle control ECU 60 to operate the driving assistance to comply with the present traffic regulation determined at S1. Operating the driving assistance to comply with the present traffic regulation determined at S1 allows the host vehicle to behave to comply with the present traffic regulation.

An example of the behavior of the host vehicle to comply with the present traffic regulation at S7 is as follows. The example is a behavior of the host vehicle not to overtake a preceding vehicle in a case where the present traffic regulation is "no overtaking" and the host vehicle is under a preferable state for overtaking the preceding vehicle. Another example includes a behavior of the host vehicle to avoid a restricted region in a case where the present traffic regulation is "restricted region" and the host vehicle enters the restricted region unless the steering control of the host vehicle to avoid the restricted region is operated.

At S8, when the behavior reason presentation related process arrives at a point of time of ending (S8: YES), the behavior reason presentation related process is ended. In contrast, when the behavior reason presentation related process does not arrive at a point of time of ending (S8: NO), the sequence returns to S1 to repeat the process. One example of a point of time for terminating the behavior reason presentation related process is the ignition power source of the host vehicle being turned into OFF state.

Note that the presentation of the behavior reason information may be configured to be operated after the driving assistance complying with the present traffic regulation. In order to increase an effect of reducing the sense of incongruity of the driver against the behavior of the host vehicle by the driving assistance to comply with the present traffic regulation, the presentation of the behavior reason information may be however operated before the driving assistance complying with the present traffic regulation, as illustrated in the flowchart of FIG. 12.

<Summary of First Embodiment>

The first embodiment provides configurations as follows. Suppose a case where when the assistance operator section 110 operates the driving assistance to comply with a traffic regulation that the driver does not remember correctly, the host vehicle exhibits a behavior that is different from that the driver assumes. Even in such a case, the behavior reason information indicating the reason for the behavior of the host vehicle is presented, enabling the driver to recognize that the behavior of the host vehicle by the driving assistance is correct. This can reduce the sense of incongruity of the driver against the driving assistance in compliance with the traffic regulation even if the driver does not remember the traffic regulation correctly. This leads to the reduction in the dissatisfaction and uneasiness which the driver mistakenly feels against the behavior of the host vehicle by the driving assistance.

An example is described in the following. For example, suppose a case where a driver does not remember correctly the content of the regulatory sign board of "no overtaking." In such a case, if the automatic driving does not operate overtaking even under a situation where the driver determines that overtaking a preceding vehicle is preferable, the driver may hold the sense of incongruity in the automatic driving. The configuration of the first embodiment responds to the above. That is, the behavior reason information such as "overtaking is not operated because of overtaking is prohibited'" is presented; the driver is thus enabled to recognize the reason for not overtaking and the sense of incongruity against the automatic driving can be reduced.

Further, suppose a case where a driver mixes up the regulatory sign board of "no crossing over lane marking line on right for overtaking" with the regulatory sign board of "no overtaking." In such a case, when the automatic driving operates overtaking of the preceding vehicle, the driver may hold the sense of incongruity against the automatic driving. The configuration of the first embodiment responds thereto. That is, the behavior reason information such as "going to overtake because the host vehicle does not cross over the lane marking line on the right under the regulation" is presented; the driver is thus enabled to recognize the reason for overtaking and the sense of incongruity against the automatic driving can be reduced.

In addition, suppose a case where the driver remembers that the regulatory sign marking of "restricted region" is the same as the regulatory sign marking of "no stopping region." In such a case, when the automatic driving operates running to avoid such a restricted region, the driver may hold the sense of incongruity against the automatic driving. The configuration of the first embodiment responds thereto. That is, the behavior reason information such as "running by avoiding a restricted region because entering is prohibited" is presented. the driver is thus enabled to recognize the reason for running by avoiding the restricted region; the sense of incongruity against the automatic driving can be reduced.

In addition, suppose a case where the driver remembers incorrectly that the division marking line of "channelized zone" signifies a prohibition of entering. In such a case, when the host vehicle running the adjacent lane of the channelized zone under automatic driving gives way to a vehicle joining with the host vehicle, the driver may hold the sense of incongruity against the automatic driving. The configuration of the first embodiment responds thereto. That is, the behavior reason information such as "giving way to a vehicle running straight the channelized zone because such a vehicle is prioritized" is presented. the driver is thus enabled to recognize the reason for giving way to a vehicle running straight the channelized zone; the sense of incongruity against the automatic driving can be reduced.

In addition, suppose a case where the driver mixes up the regulatory sign board of "road segment for sounding horn" with the regulatory sign board of the "sounding horn." In such a case, when within such a road segment for sounding horn, the horn is sounded at a spot that is different from a spot at which the regulatory sign board is installed, the driver may hold the sense of incongruity against the automatic control of sounding the horn. The configuration of the first embodiment responds thereto. That is, the behavior reason information such as "sounding horn because the course ahead provides a poor visibility" is presented; the driver is thus enabled to recognize the reason for sounding the horn and the sense of incongruity against the automatic control of sounding the horn can be reduced.

In addition, suppose a case where the driver does not remember the regulation of "regulated not to continue running overtaking lane." In such a case, when the automatic driving operates a lane change from the overtaking lane to the driving lane, the driver may hold the sense of incongruity against the automatic driving. The configuration of the first embodiment responds thereto. That is, the behavior reason information such as "returning to the driving lane because continuing running the overtaking lane is regulated" is presented. The driver is thus enabled to recognize the reason for operating the lane change from the overtaking lane to the driving lane; the sense of incongruity against the automatic driving can be reduced.

In addition, suppose a case where the driver does not remember the regulation of "regulated to temporarily halt at intersection having no traffic signal when entering from non-priority road." In such a case, when the automatic driving operates a temporary halt when entering the intersection, the driver may hold the sense of incongruity against the automatic driving. The configuration of the first embodiment responds thereto. That is, the behavior reason information such as "halting temporarily because of entering from the non-priority road" is presented. The driver is thus enabled to recognize the reason for halting temporarily; the sense of incongruity against the automatic driving can be reduced.

The first embodiment further provides another configuration as follows. That is, as the count of counting presentations of the behavior reason information in identical instances is increased, the presentation of the behavior reason information is reduced. As the degree in the driver's understanding of the reason for the behavior of the host vehicle is increased to increase a possibility of the driver' feeling the troublesomeness to the presentation of the behavior reason information, the presentation of the behavior reason information is reduced. This can reduce the troublesomeness on the driver.

First Modification Example

The first embodiment explains a configuration of decreasing a frequency in the presentations of the behavior reason information as an example of reducing the presentation of the behavior reason information depending on the presentation count of the behavior reason information. However, there is no need to be limited thereto. Another configuration (hereinafter, referred to as a first modification example) may be provided as follows. That is, when the count of counting the presentations of the behavior reason information with respect to identical instances reaches a threshold value, the presentation of the behavior reason information in the identical instances is stopped. The threshold value may be varied as needed.

With reference to an example in FIG. 13, the presentation count being ten times is regarded as a threshold value. The presentation is operated when the presentation count is less than ten times; the presentation is stopped when the presentation count is equal to or greater than ten times. Note that the example in FIG. 13 is a just example. Another configuration may be provided as long as satisfying the relation where the presentation of the behavior reason information is stopped when the presentation count reaches a threshold value.

Another configuration may be provided by combining the first embodiment with the first modification example. In such another configuration, before the presentation count reaches a threshold value, the frequency in operating the presentations of the behavior reason information is decreased as the presentation count is increased; when the presentation count reaches the threshold value, the presentation of the behavior reason information is stopped.

Second Modification Example

Further, another configuration (hereinafter, referred to as a second modification example) may be provided where reducing the presentation of the behavior reason information with respect to identical instances is achieved by changing presentation modes for presenting the behavior reason information as the presentation count is increased.

With reference to an example in FIG. 14, when the presentation count is less than four times, all the presentations of a text display via a display device, an icon display via a display device, and a speech output from the audio speaker 55 are operated. When the presentation count is less than ten times and equal to or greater than four times, a text display via a display device and an icon display via a display device are operated whereas a speech output from the audio speaker 55 is not operated. When the presentation count is equal to or greater than ten times, an icon display via a display device is operated whereas a text display via a display device is not operated and a speech output from the audio speaker 55 is not operated. This changes the presentation modes for presenting the behavior reason information to reduce the amount of the behavior reason information as the count of counting the presentations of the behavior reason information is increased, thereby reducing the presentation of the behavior reason information. In other words, when the presentation of the behavior reason information is operated for the first time or before the presentation count reaches a predetermined value, a plurality of presentation methods such as a text display, an icon display, a speech output are used for presenting the behavior reason information. Thereafter, the number of presentation methods is decreased as the presentation count is increased.

Note that the example in FIG. 14 is a just example. Another configuration may be provided as long as satisfying the relation where the presentation of the behavior reason information is reduced by changing the presentation modes as the presentation count is increased. For example, the presentation count being five times is regarded as a predetermined value at which the presentation modes are changed. When the presentation count is less than five times, all the presentations of a text display, an icon display, and a speech output are operated; when the presentation count is equal to or greater than five times, an icon display is operated.

Another configuration may be provided by combining the first modification example with the second modification example. In such another configuration, before the presentation count reaches a threshold value, the presentation modes for presenting the behavior reason information are changed as the presentation count is increased; when the presentation count reaches the threshold value, the presentation of the behavior reason information is stopped. Further, another configuration may be provided by combining the first embodiment with the second modification example, or another configuration may be provided by combining the first embodiment with the first modification example and the second modification example.

Second Embodiment

The following explains a second embodiment of the present disclosure with reference to the drawings. The driving assistance system 1 according to the second embodiment is the same as the driving assistance system according to the first embodiment, except for including a driving assistance ECU 7a in place of the driving assistance ECU 7.

Figure 15:
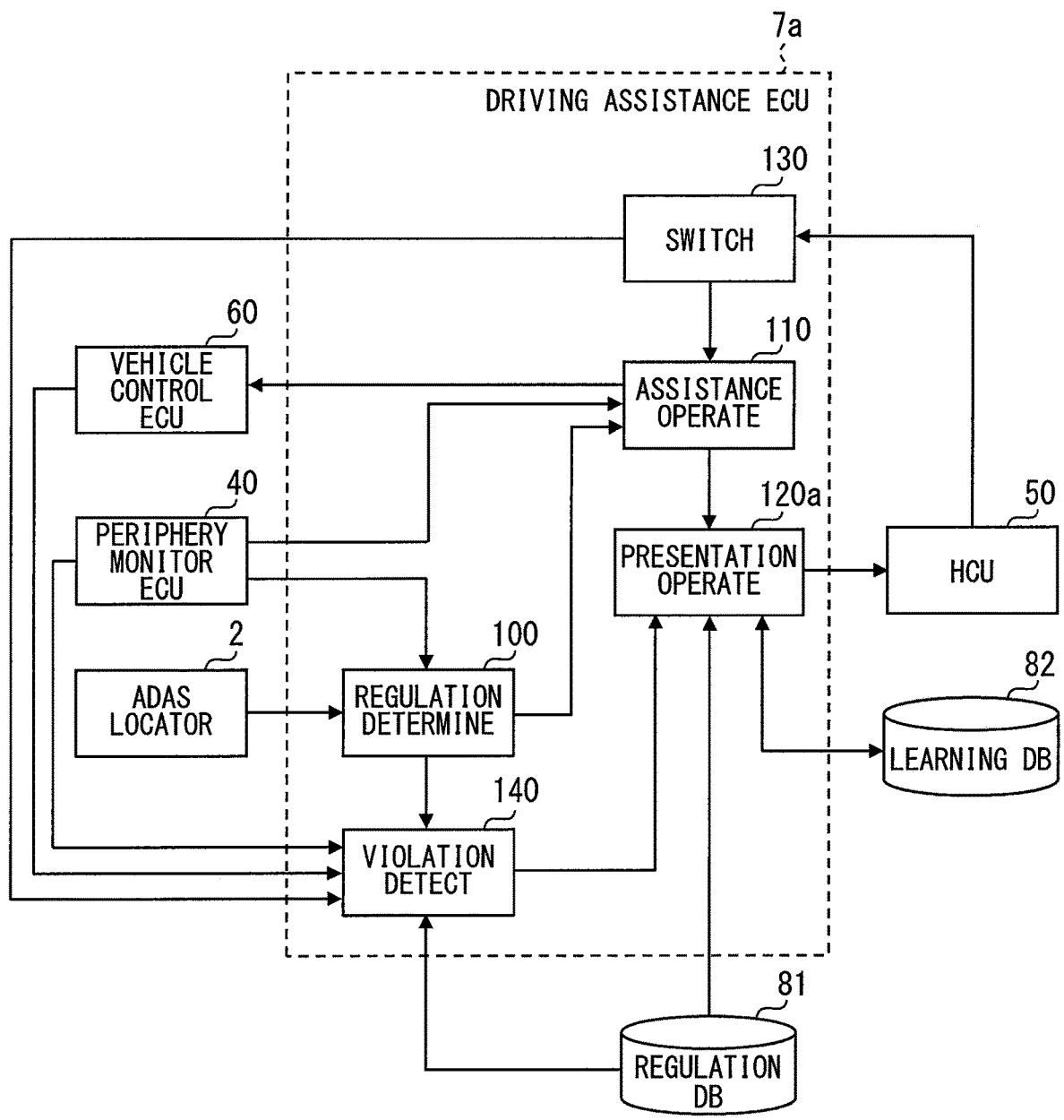
FIG. 15 is a diagram illustrating an example of a schematic configuration of a driving assistance ECU according to a second embodiment.

The following explains an example of a schematic configuration of a driving assistance ECU 7a according to the second embodiment with reference to FIG. 15. The driving assistance ECU 7a is the same as the driving assistance ECU 7 according to the first embodiment, except for including (i) a presentation operator section 120a in place of the presentation operator section 120, (ii) a switcher section 130, and (iii) a violation detector section 140. The driving assistance ECU 7a is equivalent to a driving assistance apparatus.

The switcher section 130 switches the setups of execution and inexecution of the driving assistance by the assistance operator section 110. For instance, switching the setups of execution and inexecution of the driving assistance by the switcher section 130 may be configured to be operated according to an input manipulation via the manipulation device 51. Further, switching the setups of execution and inexecution of the driving assistance by the switcher section 130 may be configured such that the setups of the execution and the inexecution are operated with respect to each of a plurality of driving assistance applications, or such that the setups of the execution and the inexecution are operated with respect to a plurality of driving assistance applications collectively.

The violation detector section 140 detects a violation resulting from a driving manipulation by the driver of the host vehicle against a present traffic regulation corresponding to an attention traffic regulation. The violation detector section 140 may determine whether the present traffic regulation corresponds to an attention traffic regulation by comparing the present traffic regulation determined by the regulation determiner section 100 with an attention traffic regulation stored in the regulation DB 81. Whether or not resulting from the driving manipulation by the driver of the host vehicle may be determined based on whether the driving assistance is switched to the execution or the inexecution in the switcher section 130. The violation against the present traffic regulation may be detected based on the information acquired from the periphery monitoring ECU 40 or the vehicle control ECU 60.

For example, the violation against the traffic regulation "no overtaking" may be detected based on that the position of a preceding vehicle relative to the host vehicle, which is successively acquired from the periphery monitoring ECU 40, changes from a position ahead of the host vehicle to a rear and lateral position relative to the host vehicle. The violation against the traffic regulation "restricted region" may be detected based on that the position of the road sign marking of "restricted region," which is successively acquired from the periphery monitoring ECU 40, changes from a position ahead of the host vehicle to a position overlapped with the host vehicle. The violation against the traffic regulation "regulated not to continue running an overtaking lane" may be detected when the host vehicle continues running the overtaking lane equal to or greater than a predetermined period of time, regardless of whether or not any object is present in the driving lane in a rear and lateral area relative to the host vehicle, based on the information on a presently running lane of the host vehicle and an object around the host vehicle, the information which is successively acquired from the periphery monitoring ECU 40. The violation against the traffic regulation "regulated to halt temporarily at an intersection having no traffic signal when entering from a non-priority road" may be determined based on that the running speed of the host vehicle acquired from the vehicle control ECU 60 does not come to 0 km/h before entering the intersection.

Upon detecting a violation, the violation detector section 140 records the present traffic regulation, which the violation is detected against, in the learning DB 82 as a present traffic regulation against which a violation is detected. In addition, suppose a case where among the instances whose presentation count of the behavior reason information is recorded in the learning DB 82, there is an instance corresponding to the present traffic regulation that is the same as the present traffic regulation against which the violation is detected. In such a case, the currently recorded presentation count of the behavior reason information about this instance is decreased.

The presentation operator section 120a is the same as the presentation operator section 120 according to the first embodiment, except for including a process in a driving assistance by the assistance operator section 110 to comply with the present traffic regulation, against which the violation is detected by the violation detector section 140.

Suppose that the assistance operator section 110 operates a driving assistance to comply with the present traffic regulation corresponding to an attention traffic regulation. In a case where the present traffic regulation is recorded in the learning DB 82 as a present traffic regulation against which the violation is detected, the presentation operator section 120a operates the presentation of the content of the behavior reason information in more detail as compared with a case where the present traffic regulation is not recorded as a present traffic regulation against which the violation is detected.

For instance, when not recorded as a present traffic regulation against which the violation is detected, the content of the traffic regulation is not included in the operated presentation; by contrast, when recorded as the present traffic regulation against which the violation is detected, the content of the traffic regulation is included in the operated presentation.

The record of the present traffic regulation against which the violation is detected in the learning DB 82 may be configured to be deleted when the behavior reason information about the driving assistance by the assistance operator section 110 is presented or be deleted when the presentation count of the behavior reason information reaches predetermined times.

In addition, suppose a case where the content of the behavior reason information is presented. In this case, with respect to an instance that the presentation count currently recorded in the learning DB 82 is decreased by the violation detector section 140, the presentation operator section 120a softens a reduction even when such a reduction is made depending on the presentation count of the behavior reason information.

Note that the presentation operator section 120a is configured not to operate an information presentation directly indicating a violation against a present traffic regulation even when such a violation is detected by the violation detector section 140. For instance, when the violation against the traffic regulation "no overtaking" is detected, the information presentation such as "having violated the regulation of no overtaking" which indicates directly the violation against the present traffic regulation is configured not to be operated.

Like in the first embodiment, the configuration of the second embodiment reduces the sense of incongruity of the driver against the driving assistance in compliance with the traffic regulation even if the driver does not remember the traffic regulation correctly.

The configuration of the second embodiment does not operate the information presentation which indicates directly the violation against such a present traffic regulation even if the driver violates a present traffic regulation under the inexecution of any driving assistance. In contrast, the behavior reason information in the driving assistance complying with the present traffic regulation is presented in more detail, or the reduction according to the presentation count is softened. The driver is thus prompted to comply with the present traffic regulation. This allows the driver to notice the importance of compliance with the present traffic regulation, without directly pointing out the violation against the present traffic regulation. As a result, even a driver, who reacts against direct pointing out of the violation against the present traffic regulation, comes to recognize the need of complying with the present traffic regulation.

In order to improve the effect of prompting the driver to recognize the need of compliance with the present traffic regulation, the violation detector section 140 is preferably configured to initialize, to zero, the presentation count recorded in the learning DB 82 about the instances corresponding to the present traffic regulation against which the violation is detected by the violation detector section 140, canceling the reduction in presentation of the behavior reason information depending on the presentation count.

Third Modification Example

The second embodiment indicates a configuration where when the violation against a present traffic regulation is detected, the presentation of the behavior reason information is operated in more detail at the time of the driving assistance complying with the present traffic regulation while the reduction in the presentation of the behavior reason information depending on the presentation count is weakened. However, there is no need to be limited thereto. For instance, another configuration may be provided which does not operate the presentation of the behavior reason information in more detail at the time of the driving assistance complying with the present traffic regulation when the violation against a present traffic regulation is detected. Further, yet another configuration may be provided which does not weaken the reduction in the presentation of the behavior reason information depending on the presentation count when the violation against a present traffic regulation is detected.

Fourth Modification Example

The second embodiment provides a configuration where the presentation operator section 120a does not operate an information presentation directly indicating a violation against a present traffic regulation even when such a violation is detected by the violation detector section 140. However, there is no need to be limited thereto. For instance, another configuration may be provided where the presentation operator section 120a operates an information presentation directly indicating a violation against a present traffic regulation when such a violation is detected by the violation detector section 140.

Third Embodiment

The following explains a third embodiment of the present disclosure with reference to the drawings. The driving assistance system 1 according to the third embodiment is the same as the driving assistance system according to the first embodiment, except for including a driving assistance ECU 7b in place of the driving assistance ECU 7.

Figure 16:
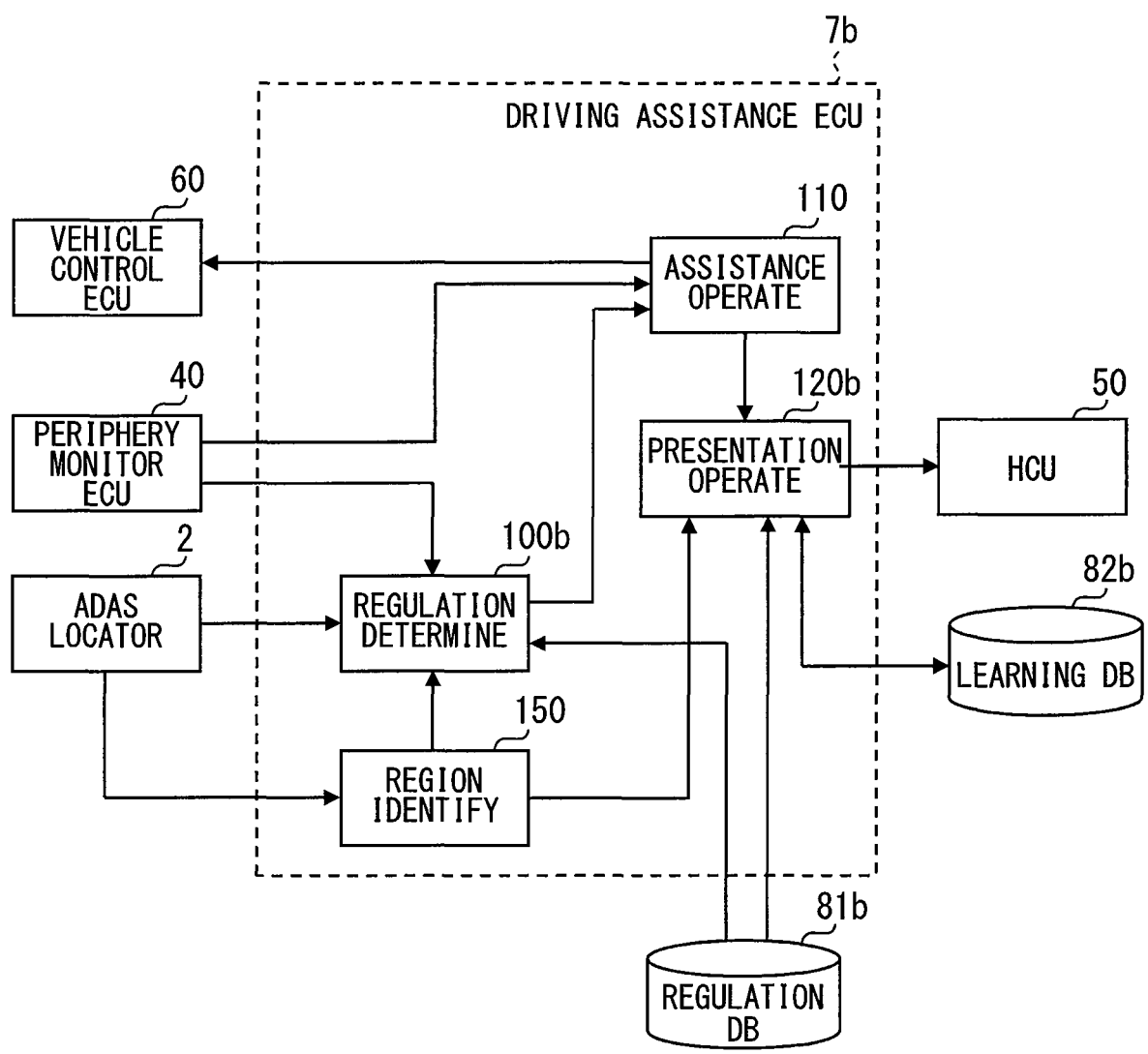
FIG. 16 is a diagram illustrating an example of a schematic configuration of a driving assistance ECU according to a third embodiment.

The following explains an example of a schematic configuration of a driving assistance ECU 7b according to the third embodiment with reference to FIG. 16. The driving assistance ECU 7b is the same as the driving assistance ECU 7 according to the first embodiment, except for: including a regulation determiner section 100b in place of the regulation determiner section 100; including a presentation operator section 120b in place of the presentation operator section 120; being connected with a regulation DB 81b in place of the regulation DB 81; being connected with a learning DB 82b in place of the learning DB 82; and including a region identifier section 150. The driving assistance ECU 7b is equivalent to a driving assistance apparatus.

The regulation DB 81b is the same as the regulation DB 81 according to the first embodiment, except for including, as attention traffic regulations, traffic regulations that are different between regions. For instance, the regulation DB 81b stores region-specific traffic regulations as attention travel regulations. Each of the region-specific traffic regulations is a traffic regulation specified by a situation which a host vehicle encounters, and the region-specific traffic regulations specified by the same situation have contents that are different between a plurality of regions The region-specific traffic regulations are stored in the regulation DB 81b for every situation while being associated with regions. The regulation DB 81b is equivalent to a regulation storage.

The regions may correspond to units of nations, units of entities leveled upper than nations, or units of entities leveled lower than nations. Further, a part of the same nation may be classified into a different nation.

One example of a region-specific traffic regulation is as follows. For a situation where a school bus stops ahead of a host vehicle, A region regulates "overtaking school bus is permitted"; B region regulates "overtaking school bus is prohibited." The following explains this example.

The region identifier section 150 identifies a region in which the host vehicle is located based on the position of the host vehicle acquired from the ADAS locator 2. For example, the information specifying the range of coordinates of latitude and longitude belonging to each of regions may be referenced, thereby identifying the region in which the host vehicle is located based on the position of the host vehicle.

The regulation determiner section 100b is the same as the regulation determiner section 100 according to the first embodiment, except for determining a present traffic regulation according to a region in which the host vehicle is located by using the region, in which the host vehicle is located, identified by the region identifier section 150.

An example of determining a traffic regulation expressed by a road sign board or a road sign marking according to the region in which the host vehicle is located includes a method of referencing a region-specific table that associates (i) road sign boards or road sign markings and (ii) the contents of traffic regulations expressed by the road sign boards or road sign markings. This table may be stored in the regulation DB 81b, for example.

An example, which determines a traffic regulation other than that expressed by a road sign board or a road sign marking according to the region in which the host vehicle is located, includes a method of referencing a region-specific table in which situations where the host vehicle encounters and the contents of traffic regulations indicated by the situations are associated with each other. This table may be stored in the regulation DB 81b, for example. The situation where the host vehicle encounters may be configured to be identified by the regulation determiner section 100b based on the monitoring information acquired from the periphery monitoring ECU 40.

Suppose a case where the assistance operator section 110 operates a driving assistance to comply with the present traffic regulation corresponding to a region-specific traffic regulation. In such a case, the learning DB 82b records, in association with each other, (i) regions where the host vehicle is located and (ii) situations, which the host vehicle encounters, associated with the traffic regulations identical to a present traffic regulation. The presentation operator section 120 may be configured to acquire the situation which the host vehicle encounters from the regulation determiner section 100b via the assistance operator section 110. In addition, the presentation operator section 120 may be configured to acquire a region where the host vehicle is located from the region identifier section 150.

The presentation operator section 120b is the same as the presentation operator section 120 according to the first embodiment, except for operating (i) the above process recording in the learning DB 82b and (ii) a process to be explained below. The presentation operator section 120 determines whether the present traffic regulation determined by the regulation determiner section 100 corresponds to a region-specific traffic regulation stored in the regulation DB 81b. Suppose a case where it is determined that it corresponds to a region-specific traffic regulation. Such a region-specific traffic regulation is associated with a situation which the host vehicle encounters in the regulation DB 81b. Thus, the situation which the host vehicle encounters is identified in the regulation DB 81b.

Then, the presentation operator section 120b identifies a region (hereinafter, referred to as previous region) associated with the identified situation in the learning DB 82b based on the identified situation which the host vehicle encounters. The comparison is then made between a region-specific traffic regulation about the identified previous region and a region-specific traffic regulation about a region, where the host vehicle is presently located, identified by the region identifier section 150, among the region-specific traffic regulations associated with the respective regions with respect to each of the situations, which the host vehicle encounters, stored in the regulation DB 81b. In a case where the compared traffic regulations are different from each other, the presentation of the behavior reason information is operated when the driving assistance is operated by the assistance operator section 110 so as to comply with the present traffic regulation determined by the regulation determiner section 100b. In this case, the presentation operator section 120b may update the record of an association relation between (i) a situation, which the host vehicle encounters, associated with a traffic regulation identical to the present traffic regulation and (ii) a region where the host vehicle is located, in the learning DB 82b, by substituting a region where the host vehicle is presently located.

The presentation of the behavior reason information will be explained with an example case where a host vehicle moves from A region whose traffic regulation regulating "overtaking school bus permitted" to B region whose traffic regulation regulating "overtaking school bus prohibited."

Suppose a case where the host vehicle, which has moved from A region to B region, encounters a situation where a school bus is stopping ahead of the host vehicle. In such a case, the presentation operator section 120b operates the presentation of the behavior reason information such as "stopping because of "overtaking school bus prohibited," and the assistance operator section 110 then stops automatically the host vehicle in an area behind the school bus.

In addition, in a case of a driving assistance operated to comply with a region-specific traffic regulation, the presentation operator section 120b is preferably configured to operate the presentation of a content of the behavior reason information in more detail, as compared with a case of a driving assistance operated to comply with an attention traffic regulation other than the region-specific traffic regulation. For instance, the content of the presentation may be "stopping because B region regulates that overtaking the school bus is prohibited," which is more detail than "stopping because of overtaking school bus prohibited." Further, the presentation may be operated to compare both the traffic regulations before and after the regions where the host vehicle is located are switched.

Like the first embodiment, the configuration according to the third embodiment can reduce the sense of incongruity of the driver against the driving assistance even if the driver does not remember the traffic regulation correctly. Further, the configuration according to the third embodiment operates the presentation of the behavior reason information indicating the reason for the behavior of the host vehicle even in a case where the driver does not remember correctly a traffic regulation that is different between regions, enabling the driver's sense of incongruity against the driving assistance to be alleviated.

Note that traffic regulations expressed by road sign boards and road sign markings with respect to each of regions may be stored in the regulation DB 81b to be associated with the respective regions as attention traffic regulations. Now suppose a case where the region identified by the region identifier section 150 is switched from a previous region to a present region, and the present traffic regulation corresponds to a traffic regulation different from a previous region before switching. In such a case, when the driving assistance is operated by the assistance operator section 110 so as to comply with the present traffic regulation, the presentation of the behavior reason information is operated.

Fifth Modification Example

The first embodiment, the second embodiment, and the third embodiment each indicate an example configuration of an automatic driving that operates all of acceleration, braking, and steering of the host vehicle at least in a predetermined road segment. However, there is no need to be limited thereto. For example, another configuration may be provided with an automatic driving automatically operating part of acceleration, braking, and steering of the host vehicle.

Sixth Modification Example

The first embodiment, the second embodiment, and the third embodiment each indicate a configuration to operate both (i) the driving assistance which controls the movement of the host vehicle, such as acceleration, braking, and steering of the host vehicle, and (ii) the driving assistance which controls other than the movement of the host vehicle, such as automatically sounding a horn. However, there is no need to be limited thereto. For example, another configuration may be provided which operates only the driving assistance controlling the movement of the host vehicle, or which operates only the driving assistance controlling other than the movement of the host vehicle.

In addition, another configuration may be provided which operates the driving assistance outputting an alarm. In such a configuration, even if an alarm that the driver does not assume is outputted, the behavior reason information indicating the reason for outputting such an alarm is presented. The driver is enabled to recognize the correctness of outputting the alarm by the driving assistance.

Seventh Modification Example

The first embodiment, the second embodiment, and the third embodiment each indicate a configuration where the DB 8 is mounted in the host vehicle. However, there is no need to be limited thereto. For example, the DB 8 may be configured to be installed in a server apparatus external to the host vehicle. In the above configuration, the driving assistance ECUs 7, 7a, 7b may be configured to access the DB 8 via an in-vehicle communication module etc.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

The invention claimed is:

1. A driving assistance apparatus used in a vehicle, comprising:
   a regulation determiner section configured to determine a present traffic regulation which is a traffic regulation in a running environment of the vehicle running;
   an assistance operator section configured to execute driving assistance that assists driving of the vehicle such that the vehicle complies with the present traffic regulation determined by the regulation determiner section; and
   a presentation operator section configured to present a presentation of behavior reason information to a driver,
   wherein when the assistance operator section executes driving assistance to comply with a present traffic regulation corresponding to an attention traffic regulation, which the driver is liable to make a mistake and which is stored in a regulation storage, the presentation operator section presents the presentation of behavior reason information which indicates to the driver a reason for a behavior of the vehicle resulting from the driving assistance operated by the assistance operator section to comply with the present traffic regulation corresponding to the attention traffic regulation,
   wherein the driving assistance executed by the assistance operator section automatically assists at least one of an acceleration control, a braking control, and a steering control of the vehicle,
   wherein the assistance operator section switches driving assistance between execution of driving assistance and inexecution of driving assistance,
   wherein the driving assistance apparatus further comprises a violation detector section configured to detect, during inexecution of driving assistance, a violation by the driver for performing a driving manipulation in violation of the present traffic regulation corresponding to the attention traffic regulation, and
   wherein in cases that the assistance operator section executes the driving assistance to comply with the present traffic regulation corresponding to the attention traffic regulation while the presentation operator section presents the presentation of behavior reason information, content of the presentation of behavior reason information to the driver in cases in which a violation by the driver is previously detected during inexecution of the driving assistance is more detailed than content of the presentation of behavior reason information to the driver in cases in which a violation by the driver is not previously detected during inexecution of the driving assistance.

2. The driving assistance apparatus according to claim 1, wherein
the presentation operator section reduces the presentation of behavior reason information with respect to identical instances in which traffic regulations are identical to the present traffic regulation corresponding to the attention traffic regulation with which the driving assistance complies, as a count of counting presentations of behavior reason information with respect to the identical instances is increased.

3. The driving assistance apparatus according to claim 2, wherein
the presentation operator section decreases a frequency in operating the presentations of behavior reason information with respect to the identical instances in which traffic regulations are identical to the present traffic regulation corresponding to the attention traffic regulation with which the driving assistance complies, as the count of counting the presentations of behavior reason information with respect to the identical instances is increased.

4. The driving assistance apparatus according to claim 2, wherein
the presentation operator section stops operating the presentation of behavior reason information with respect to the identical instances in which traffic regulations are identical to the present traffic regulation corresponding to the attention traffic regulation with which the driving assistance complies, when the count of counting the presentations of behavior reason information with respect to the identical instances reaches a threshold value.

5. The driving assistance apparatus according to claim 2, wherein
the presentation operator section reduces the presentation of behavior reason information by changing modes in operating the presentation of behavior reason information with respect to the identical instances in which traffic regulations are identical to the present traffic regulation corresponding to the attention traffic regulation with which the driving assistance complies, as the count of counting the presentations of behavior reason information with respect to the identical instances is increased.

6. The driving assistance apparatus according to claim 1, wherein
the driving assistance operated by the assistance operator section automatically assists all controls of an acceleration control, a braking control, and a steering control of the vehicle, at least in a predetermined road segment.

7. A driving assistance apparatus used in a vehicle, comprising:
a regulation determiner section configured to determine a present traffic regulation, which is a traffic regulation in a running environment of the vehicle running;
an assistance operator section configured to execute driving assistance that assists driving of the vehicle such that the vehicle complies with the present traffic regulation determined by the regulation determiner section; and
a presentation operator section configured to present a presentation of behavior reason information to a driver,
wherein when the assistance operator section executes driving assistance to comply with a present traffic regulation corresponding to an attention traffic regulation, which the driver is liable to make a mistake and which is stored in a regulation storage, the presentation operator section presents the presentation of behavior reason information which indicates to the driver a reason for a behavior of the vehicle resulting from the driving assistance operated by the assistance operator section to comply with the present traffic regulation corresponding to the attention traffic regulation,
wherein the presentation operator section reduces the presentation of behavior reason information with respect to identical instances whose traffic regulations are identical to the present traffic regulation corresponding to the attention traffic regulation with which the driving assistance complies, as a count of counting presentations of behavior reason information with respect to the identical instances is increased,
wherein setting of the driving assistance by the assistance operator section is enabled to be switched between under an execution of the driving assistance and under an inexecution of the driving assistance,
wherein the driving assistance apparatus further comprising:
a violation detector section configured to detect, under the inexecution of the driving assistance, a violation by the driver performing a driving manipulation against the present traffic regulation corresponding to the attention traffic regulation,
wherein:
the driving assistance operated by the assistance operator section automatically assists at least one control of three controls that are an acceleration control, a braking control, and a steering control of the vehicle;
even in cases of reducing the presentation of behavior reason information with respect to the identical instances whose traffic regulations are identical to the present traffic regulation corresponding to the attention traffic regulation, the presentation operator section softens the reducing of the presentation of behavior reason information in cases that the violation by the driver against the present traffic regulation under the inexecution of the driving assistance is detected by the violation detector section.

8. The driving assistance apparatus according to claim 7, wherein
the presentation operator section decreases a frequency in operating the presentations of behavior reason information with respect to the identical instances whose traffic regulations are identical to the present traffic regulation corresponding to the attention traffic regulation with which the driving assistance complies, as the count of counting the presentations of behavior reason information with respect to the identical instances is increased.

9. The driving assistance apparatus according to claim 7, wherein
the presentation operator section stops operating the presentation of behavior reason information with respect to the identical instances whose traffic regulations are identical to the present traffic regulation corresponding to the attention traffic regulation with which the driving assistance complies, when the count of counting the presentations of behavior reason information with respect to the identical instances reaches a threshold value.

10. The driving assistance apparatus according to claim 7, wherein
the presentation operator section reduces the presentation of behavior reason information by changing modes in operating the presentation of behavior reason information with respect to the identical instances whose traffic regulations are identical to the present traffic regulation corresponding to the attention traffic regulation with which the driving assistance complies, as the count of counting the presentations of behavior reason information with respect to the identical instances is increased.

11. The driving assistance apparatus according to claim 7, wherein
the driving assistance operated by the assistance operator section automatically assists all controls of an acceleration control, a braking control, and a steering control of the vehicle, at least in a predetermined road segment.

12. A driving assistance apparatus used in a vehicle, comprising:
a regulation determiner section configured to determine a present traffic regulation, which is a traffic regulation in a running environment of the vehicle running;
an assistance operator section configured to execute driving assistance that assists driving of the vehicle such that the vehicle complies with the present traffic regulation determined by the regulation determiner section; and
a presentation operator section configured to present a presentation of behavior reason information to a driver,
wherein when the assistance operator section executes driving assistance to comply with a present traffic regulation corresponding to an attention traffic regulation, which the driver is liable to make a mistake and which is stored in a regulation storage, the presentation operator section presents the presentation of behavior reason information which indicates to the driver a reason for a behavior of the vehicle resulting from the driving assistance operated by the assistance operator section to comply with the present traffic regulation corresponding to the attention traffic regulation,
wherein the driving assistance apparatus further comprising:
a region identifier section configured to identify one of regions in which the vehicle is located,
wherein:
the regulation storage is further configured to store region-specific traffic regulations as the attention traffic regulation, the region-specific traffic regulations being different between the respective regions; and
in cases that a region identified by the region identifier section is switched from a previous region to a present region,
when (i) the present traffic regulation corresponds to a region-specific traffic regulation, which is different between the previous region and the present region, among the attention traffic regulation stored in the regulation storage, and simultaneously (ii) a driving assistance to comply with the present traffic regulation is operated by the assistance operator section, the presentation operator section presents the presentation of behavior reason information on a reason of a behavior resulting from the driving assistance to comply with the present traffic regulation,
in cases that the presentation operator section operates the presentation of behavior reason information to comply with the present traffic regulation,
a presentation of a content of the behavior reason information operated when the present traffic regulation corresponds to the region-specific traffic regulation is more detailed than a presentation of a content of behavior reason information operated when the present traffic regulation corresponds to a region-common traffic regulation that is a traffic regulation common to the regions.

13. The driving assistance apparatus according to claim 12, wherein
the driving assistance executed by the assistance operator section automatically assists at least one of an acceleration control, a braking control, and a steering control of the vehicle.

14. The driving assistance apparatus according to claim 13, wherein
the assistance operator section switches driving assistance between execution of driving assistance and inexecution of driving assistance,
the driving assistance apparatus further comprising:
a violation detector section configured to detect, during inexecution of the driving assistance, a violation by the driver for performing a driving manipulation in violation of the present traffic regulation corresponding to the attention traffic regulation, and
wherein:
in cases that the assistance operator section executes the driving assistance to comply with the present traffic regulation corresponding to the attention traffic regulation while the presentation operator section presents the presentation of behavior reason information,
content of the presentation of behavior reason information to the driver in cases in which a violation by the driver is previously detected during inexecution of the driving assistance is more detailed than content of the presentation of behavior reason information to the driver in cases in which a violation by the driver is not previously detected during inexecution of the driving assistance.

15. The driving assistance apparatus according to claim 13, wherein
the driving assistance operated by the assistance operator section automatically assists all controls of an acceleration control, a braking control, and a steering control of the vehicle, at least in a predetermined road segment.

16. The driving assistance apparatus according to claim 12, wherein
the presentation operator section reduces the presentation of behavior reason information with respect to identical instances whose traffic regulations are identical to the present traffic regulation corresponding to the attention traffic regulation with which the driving assistance complies, as a count of counting presentations of behavior reason information with respect to the identical instances is increased.

* * * * *